United States Patent Office 3,274,258
Patented Sept. 20, 1966

3,274,258
HYDROXYBENZYL THIOETHERS AND METHOD
OF PREPARATION
Joseph D. Odenweller, Birmingham, Mich., assignor to
Ethyl Corporation, New York, N.Y., a corporation of
Virginia
No Drawing. Filed Sept. 1, 1960, Ser. No. 53,353
6 Claims. (Cl. 260—609)

This invention deals with a novel class of compounds, their preparation and their use as antioxidants. More particularly, it relates to a novel and unusual class of sulfur-containing substituted phenolic compounds, their preparation from the corresponding benzyl chlorides and the employment of these novel compounds as stabilizers and antioxidants for organic materials.

It is an object of this invention to provide a novel class of chemical compounds. A further object of this invention is to provide a novel method for preparation of these compounds. Another object is to provide novel compositions of matter comprising organic material stabilized against oxidative deterioration. A specific object of this invention is to provide lubricating oil stabilized against oxidative deterioration. Another specific object is to provide leaded gasoline containing manganese compounds stabilized against oxidative deterioration. Other objects will become apparent from the following description of the invention.

The above and other objects are accomplished by provision of a compound having the formula:

(I)
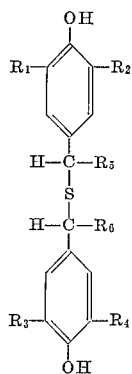

wherein $R_1$ and $R_3$ are each independently selected alkyl radicals having from 1 to 12 carbon atoms, $R_2$ and $R_4$ are each independently selected alpha-branched alkyl radicals having from 3 to 12 carbon atoms and $R_5$ and $R_6$ are selected from the group consisting of hydrogen, alkyl radicals having from 1 to 12 carbon atoms and mononuclear aryl radicals having from 6 to 12 carbon atoms. Thus, the two phenolic radicals in the above formula may be the same or different. Examples of the compounds of this invention include α,α'-thiobis(2-sec-butyl-6-tert-butyl-p-cresol);
$α^4,α^{4'}$-thiobis(2-methyl-6-isopropyl-4-sec-butylphenol);
α,α'-thiobis(2-ethyl-6-isoamyl-p-cresol);
$α^4,α^{4'}$-thiobis[2-isopropyl-6-(2'-heptyl)-4-n-heptylphenol];
α,α'-thiobis(2,6-diisopropyl-p-cresol);
$α^4,α^{4'}$-thiobis[2-n-butyl-6-(3'-nonyl)-4-n-dodecylphenol];
α,α'-thiobis(2,6-di-tert-butyl-p-cresol);
$α^4,A^{4'}$-thiobis[2-n-amyl-6-(3'-dodecyl)-4-n-butylphenol];
α,α'-thiobis(2-n-heptyl-6-tert-butyl-p-cresol);
$α^4,α^{4'}$-thiobis[2-(3'-nonyl)-6-isopropyl-4-ethylphenol];
α,α'-thiobis(2-n-dodecyl-6-sec-butyl-p-cresol);
$α^4,α^{4'}$-thiobis(2,6-di-tert-butyl-4-hydroxybenzyl);
(3-isopropyl-5-tert-butyl-4-hydroxy-benzyl)-(3-ethyl-5-tert-butyl-4-hydroxybenzyl)-thio ether;
α,α'-thiobis[2-methyl-6-tert-butyl-4-(4'-hexylbenzyl)-phenol].

The compounds of this invention are water insoluble, white to yellow, crystalline solids. They are ashless, hydrolytically stable and non-volatile, facilitating their incorporation into a wide range of organic material.

Although the compounds of this invention described in the above formula, are those in which $R_5$ and $R_6$ are alkyl radicals having from 1 to 12 carbon atoms, haloalkyl radicals having from 1 to 12 carbon atoms are also useful.

A preferred embodiment of this invention consists of compounds of the above formula wherein $R_5$ and $R_6$ are hydrogen. These compounds are preferred because of their ease of preparation from readily available starting materials and greater antioxidant activity. Among the compounds represented by this preferred embodiment are α,α'-thiobis[2-isopropyl-6-(3'-nonyl)-p-cresol];
α,α'-thiobis(2,6-di-tert-butyl-p-cresol);
α,α'-thiobis[2-n-propyl-6-(2'-octyl)-p-cresol];
α,α'-thiobis[2-sec-butyl-6-(4'-dodecyl)-p-cresol];
(3-methyl-5-isopropyl-4-hydroxybenzyl)-(3-n-butyl-5-tert-butyl-4-hydroxybenzyl)thioether;
(3-methyl-5-tert-butyl-4-hydroxybenzyl)-(3-n-propyl-5-dibutyl-4-hydroxybenzyl)thioether;
α,α'-thiobis(2-methyl-6-n-propyl-p-cresol);
[3-(3'-hendecyl)-5-(2'-decyl)-4-hydroxybenzyl]-(3-methyl-5-isoamyl-4-hydroxybenzyl)thioether;
α,α'-thiobis[2-ethyl-6-(3'-dodecyl)-p-cresol];
α,α'-thiobis(2-methyl-6-isopropyl-p-cresol); and
α,α'-thiobis(2-methyl-6-tert-butyl-p-cresol).

The most particularly preferred compound of this invention is α,α'-thiobis(2,6-di-tert-butyl-p-cresol) which is a most superior antioxidant for lubricating oils.

The compounds of this invention can be produced by a four step method which comprises reacting a compound of the formula:

(II)
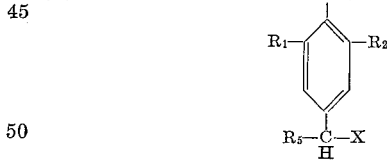

wherein $R_1$, $R_2$ and $R_5$ are as in Formula I, and X is a halogen, first with thio-urea, then chlorine, and then reducing the resultant benzyl sulfonyl chloride with sulfuric acid and metallic zinc to the benzylthiol. This is then reacted with a compound of the formula:

(III)
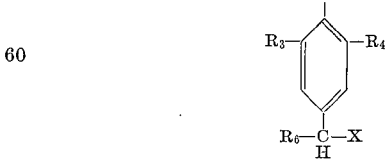

wherein $R_3$, $R_4$ and $R_6$ are as in Formula I, and X is a halogen, to yield compounds of Formula I.

The above reactions can be illustrated by the following general equations:

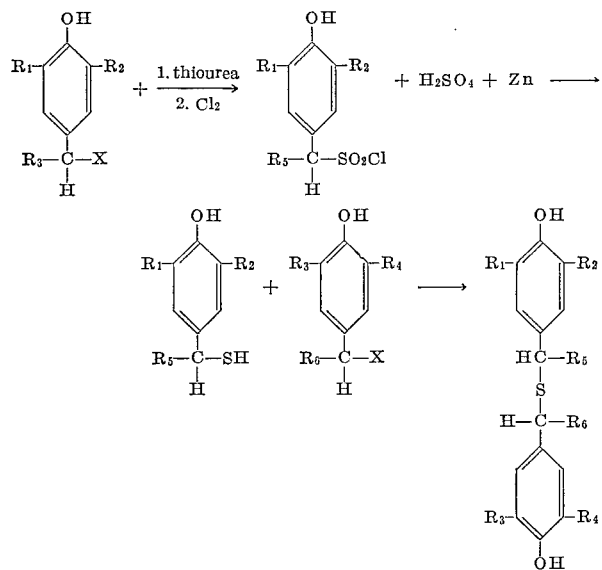

In the above reactions the halide preferred is chlorine but other halogens of atomic weight greater than 17 may also be used. Chlorine is preferred because of its cost effectiveness and high reactivity.

The preparation of certain preferred reactants of Formulas II and III is disclosed in an application filed concurrently with the present application entitled, "Organic Aromatic Compounds," the inventor being Joseph D. Odenweller. They can be prepared by reacting a suitable 2,6-dialkylphenol with an aldehyde having from 1 to 13 carbon atoms and concentrated hydrogen halide. Thus, 2,6-di-tert-butyl-4-hydroxybenzyl chloride can be prepared by reacting 2,6-di-tert-butylphenol with formaldehyde and 35 percent hydrochloric acid.

The temperatures employed in practicing this invention vary from −20° C. to the reflux temperature of the highest boiling solvent, about 305° C., at reaction times of from a few minutes to one week or more to give a good yield of product.

In the reaction of the benzylsulfonyl halide, a preferred temperature range is from about 20° C. to about 150° C. The reaction proceeds at a sufficiently rapid rate in this temperature range to give a good yield of product in a reasonable time with a minimum of undesirable side reactions.

Although excellent results are obtained throughout the temperature and time ranges stated above, preferred reaction times are from about 5 minute to about 12 hours. These reaction times give excellent results.

To obtain the elevated temperatures sometimes employed in this reaction, pressure may be resorted to. However, with most of the compounds, atmospheric pressure is sufficient.

The solvents used in the practice of this invention may include secondary and tertiary alcohols, ethers, ketones, glycol ethers, aliphatic tertiary amines, pyridine, or any suitable polar solvent. For example, solvents used may be water; aliphatic secondary and tertiary alcohols having from 3 to 5 carbon atoms such as isopropanol, secondary butyl alcohol and tertiary amyl alcohol; ketones having from 3 to about 13 carbon atoms such as acetone, methyl ethyl ketone, methyl-n-propyl ketone and benzophenone; the monoethers of the lower glycols such as ethylene glycol monomethyl ether up to ethylene glycol monoamyl ether; dioxane; aliphatic tertiary amines having from 6 to 12 carbon atoms such as triethyl amine, tri-n-propyl amine and tri-n-butyl amine; or pyridine.

All of the above solvents with the exception of the amines and pyridine, may be used in all the reactions indicated above except the reaction of the benzylthiol with benzyl halide. In this latter reaction the use of pyridine or tertiary amines is preferred. These solvents enhance the reaction rate by absorbing hydrogen halide, one of the reaction products.

The following example illustrates the compounds of this invention and their preparation according to the method outlined above.

*Example 1*

To a reaction vessel equipped with cooling and heating means, a stirrer, a thermometer, a water cooled condenser and sintered disperson tube, is added 254 parts of 3,5-di-tert-butyl-4-hydroxybenzyl chloride, 76 parts of thiourea and 600 parts of isopropyl alcohol. The temperature is raised and the reaction mixture is allowed to reflux for 30 minutes. The reaction vessel is allowed to cool and 1000 parts of water are added. The mixture is cooled to about 0° C. A source of anhydrous chlorine gas is attached to the sintered tube and chlorine gas is passed into the solution, maintaining the temperature between 0 to 10° C. until formation of the insoluble benzylsulfonyl chloride is complete (about one hour). The benzylsulfonyl chloride is separated by filtration and 63.2 parts of it are added to 140 parts of 95 percent $H_2SO_4$ and 425 parts of ice in the reaction vessel described above. To this is added 72 parts of zinc dust, while maintaining the temperature below 0° C. The mixture is stirred for one hour, during which time the temperature rises to reflux. After cooling, the 3,5-di-tert-butyl-4-hydroxybenzyl thiol thus formed is extracted with ethyl ether. The ether is evaporated off by heating to give the benzylthiol in good yield. In a reaction vessel equipped with cooling and heating means, a thermometer and stirrer, 25.2 parts of the above benzylthiol is added to a solution of 25.5 parts of 3,5-di-tert-butyl-4-hydroxybenzyl chloride in 200 parts of pyridine, maintaining the temperature at about 20° C. After the addition, the solution is warmed to 50° C. for 15 minutes and then cooled to about 20° C. Two hundred parts of water are then added to the reaction mixture and α,α'-thiobis(2,6-di-tert-butyl-p-cresol) is filtered off. It is purified by recrystallization from isooctane and found to have a melting point of 141 to 143° C. Upon sulfur analysis 6.87 percent sulfur is found. Calculated sulfur for $C_{30}H_{46}O_2S$ is 6.81 percent.

*Example 2*

Fifty-five parts of 3-methyl-5-(3'-dodecyl)-α-ethyl-4-hydroxybenzyl chloride, 14 parts of thiourea and 130 parts of dioxane are mixed in a reaction vessel equipped with cooling and heating means, a thermometer, a stirrer, a sintered disperson tube and a water condenser. The mixture is heated to 75° C. and maintained at that temperature for 12 hours. The reaction vessel is cooled to about 20° C. and 250 parts of water are added. A source of anhydrous chlorine gas is attached to the sintered tube and the mixture is cooled to about 0° C. Chlorine gas is passed into the solution, maintained at a temperature of between 0–10° C. for about 2 hours. The insoluble benzylsulfonyl chloride precipitates and is separated by filtration. Twelve parts of it are added to 30 parts of 95 percent $H_2O_4$ and 100 parts of ice in a reaction vessel equipped with cooling and heating means, a stirrer and a condenser. Fifteen parts of zinc dust are added while maintaining the temperature below 0° C. The mixture is stirred and allowed to heat to reflux, maintaining reflux for 5 hours with additional heat. 3-Methyl-5-(3'-dodecyl)-α-ethyl-4-hydroxybenzyl thiol precipitates and after cooling is extracted with ethyl ether. The ether is stripped with heating to yield the benzylthiol. Five parts of this benzylthiol is added to a mixture of 5 parts of 3-n-dodecyl-5-sec-butyl-4-hydroxybenzyl bromide in 40 parts of tri-n-propyl amine, maintaining the temperature at about 10° C. The solution is warmed to 60° C. for 5 minutes and then cooled to about 10° C. Fifty parts of water are then added to the reaction mixture and [3-methyl-5-(3'-dodecyl)-α-ethyl-4- hydroxybenzyl] - [3-n-dodecyl-5-sec-butyl-4-hydroxybenzyl]thioether is filtered off and purified by recrystallization from hexane.

*Example 3*

Using the reaction vessel and equipment of Example 1, 260 parts of 3,5-diisopropyl-4-hydroxybenzyl iodide, 80 parts of thiourea and 650 parts of tertiary amyl alcohol are mixed together. The reaction vessel is heated until the mixture refluxes for 2 minutes and then allowed to cool to about 20° C. One thousand parts of water are added and the mixture is further cooled to about −20° C. A source of anhydrous chlorine gas is attached to the sintered tube and chlorine gas is passed through the reaction mixture, maintaining the temperature below 10° C. The gas is passed through the mixture with stirring for 3 hours during which time the insoluble benzylsulfonyl chloride precipitates. After separation by filtration 65 parts of it are added to 150 parts of 95 percent $H_2SO_4$ and 450 parts of ice in the same reaction vessel used above. Seventy-five parts of zinc dust is then added, while maintaining the temperature below 0° C. The mixture is stirred and allowed to rise in temperature to reflux at which point it is cooled. The 3,5-diisopropyl-4-hydroxybenzyl thiol thus formed is extracted with ethyl ether. The ether is evaporated off by heating to give the benzylthiol in good yield. In a reaction vessel equipped with cooling and heating means, a stirrer and thermometer, 25 parts of the above benzylthiol, 225 parts of triethyl amine and 25 parts of 3-methyl-5-tert-butyl-α-methyl-4-hydroxybenzyl chloride are mixed together maintaining the temperature at about 10° C. The solution is then warmed to 65° C. for 30 minutes and then cooled to about 20° C. Two hundred parts of water are added to the reaction mixture and (3,5-diisopropyl-4-hydroxybenzyl)-(3-methyl-5-tert-butyl-α-methyl-4-hydroxybenzyl chloride)thioether precipitates. The product is filtered and purified by recrystallization from ethyl-hexane.

*Example 4*

In a reaction vessel equipped with a stirrer, heating and cooling means, a thermometer, sintered dispersion tube and a water cooled condenser, 600 parts of 3-n-butyl-5-(4'-octyl)-α-n-hexyl-4-hydroxybenzyl chloride, 150 parts of thiourea and 1100 parts of sec-butyl alcohol are mixed together. The mixture is heated to boiling and allowed to reflux for one hour. The vessel is cooled to about 20° C. and 2,000 parts of water are added. The mixture is then further cooled to about 0° C. A source of anhydrous chlorine gas is attached to the sintered tube and chlorine gas is passed into the reaction mixture for 20 minutes, maintaining the temperature below 10° C. The benzylsulfonyl chloride precipitates and is separated by filtration. One hundred twenty-five parts of this are added to 280 parts of 95 percent $H_2SO_4$ and 800 parts of ice in the reaction vessel described above. While maintaining the temperature below 0° C., 150 parts of zinc dust is added and the mixture is stirred for 2 hours during which time the temperature rises to reflux and is maintained at reflux by additional heating. The vessel is then cooled and the 3-n-butyl-5-(4'-octyl)-α-n-hexyl-4-hydroxybenzyl thiol thus formed is extracted with ethyl ether. The ether is stripped by heating to give the pure benzylthiol. Fifty parts of this benzylthiol, 50 parts of 3-(2'-octyl)-5-(2'-amyl)-α-n-propyl-4-hydroxybenzyl chloride and 400 parts of pyridine are mixed together maintaining the temperature at about 20° C. The temperature is then slowly raised to about 70° C., maintained at that temperature for 10 minutes and then cooled to about 20° C. Four hundred parts of water are then added to the reaction mixture and [3-n-butyl-5-(4'-octyl)-α-n-hexyl-4-hydroxybenzyl] - [3 - (2' - octyl)-5-(2'-amyl)-α-n-propyl-4-hydroxybenzyl] thioether is filtered off. It is purified by recrystallization from isooctane.

Good results are also obtained when other benzyl chlorides are treated in the manner of the above examples. For example, the reaction of 3-methyl-5-(3'-dodecyl)-α-methyl-4-hydroxybenzyl chloride (produced from the reaction of 2-methyl-6-(3'-dodecyl)phenol with acetaldehyde and hydrochloric acid) with thiourea in dioxane, followed by a reaction with chlorine gas at −20° C. for one week yields 3-methyl-5-(3'-dodecyl)-α-methyl-4-hydroxybenzylsulfonyl chloride. This can then be reduced with zinc and sulfuric acid. The resultant benzylthiol can then be reacted with 3-(2'-dodecyl)-5-isopropyl-α-p-hexylphenyl-4-hydroxybenzyl bromide (produced by the reaction of 2-(2'-dodecyl)-6-isopropylphenol with p-hexylbenzaldehyde and hydrobromic acid) in tributylamine at 150° C. for 5 minutes to produce [3-methyl-5-(3'-dodecyl)-α-methyl - 4 - hydroxybenzyl] - [3''-(2'''-dodecyl)-5''-isopropyl - α'' - p-hexylphenyl-4''-hydroxybenzyl] thioether. Likewise, 3 - n-butyl-5-(3'-octyl)-α-n-dodecyl-4-hydroxybenzyl bromide (produced by the reaction of 2-n-butyl-5-(3'-octyl)phenol with n-tridecaldehyde and hydrobromic acid) can be reacted with thiourea in benzophenone at 305° C., followed by cooling and consequent reaction with chlorine gas to yield the corresponding benzylsulfonyl chloride. This can be reacted with zinc and $H_2SO_4$ at 20° C. for 12 hours to reduce it to the corresponding benzylthiol. This benzylthiol can then be reacted with 3,5-di-(2'-dodecyl)-α-n-amyl-4-hydroxybenzyl iodide (prepared from the reaction of 2,6-di-n-dodecylphenol with caproaldehyde and hydriodic acid) in triethylamine at 60° C. for 2 minutes to give [3-n-butyl-5-(3'-octyl)-α-n-dodecyl-4 - hydroxybenzyl] - [3'',5''-di-(2'''-dodecyl)-α''-n-amyl-4''-hydroxybenzyl] thioether.

The compounds of this invention are outstanding antioxidants. Therefore, an embodiment of this invention is a new composition of matter which comprises organic material normally tending to undergo oxidative deterioration in the presence of air, oxygen or ozone containing an appropriate quantity—from 0.001 up to about 5 percent, and preferably from about 0.25 to about 2 percent—of a compound of this invention as described in Formula I above.

The compounds of this invention find important utility as antioxidants in a wide variety of oxygen-sensitive material. Thus, liquid hydrocarbon fuels such as gasoline, kerosene and fuel oil are found to possess increased storage stability by the use of an antioxidant of this invention. Likewise, liquid hydrocarbon fuels such as gasoline which contain organometallic additives such as tetraethyllead as well as other organometallic compounds which are used as fuel additives attain appreciably increased oxidative stability by the practice of this invention. In addition, lubricant oils and functional fluids, both those derived from naturally occurring hydrocarbons and those synthetically prepared are greatly enhanced by the practice of this invention. The addition of small quantities of the compounds of this invention to such materials as turbine, hydraulic, transformer and other highly refined industrial oils, soaps and greases; plastics; synthetic polymers such as polyethylene and polypropylene; organometallic compositions where such fluids contain tetraethyllead and tetraethyllead antiknock mixtures as well as other organometallics; elastomers, including natural rubber; lubricating greases; crankcase lubricating oils; and the like, greatly increase resistance to deterioration in the presence of air, oxygen or ozone.

The compounds of this invention are also very useful in protecting petroleum wax—paraffin wax and microcrystalline wax—against oxidative deterioration. They also find use in the stabilization of edible fats and oils of animal and vegetable origin which tend to become rancid, especially during long periods of storage because of oxidative deterioration. Typical representatives of these edible fats and oils are linseed oil, cod liver oil, castor oil, soy bean oil, rape seed oil, coconut oil, olive oil, palm oil, corn oil, seseme oil, peanut oil, babassu oil, butter fat, lard beef tallow, and the like.

The compounds of this invention are also useful in preventing oxidative deterioration in lubricating oil compositions. Thus an embodiment of this invention is a lubricating oil normally susceptible to oxidative deterioration in a small antioxidant quantity, up to 5 percent, of a compound of this invention as defined above.

To prepare the lubricants of this invention an appropriate quantity—from about 0.001 to about 5 percent and preferably from about 0.25 to about 2 percent—of a compound of this invention is blended with the base oil to be protected. Suitable base oils include mineral oils and also synthetic diester oils such as sebacates, adipates, etc., which find particular use as aircraft instrument oils, hydraulic and damping fluids and precision bearing lubricants. All of these base oils are normally susceptible to oxidative deterioration, especially at elevated temperatures. The finished lubricants of this invention have much greater oxidation stability and many other improved performance characteristics as compared with the corresponding base oils.

To illustrate the benefits obtained by the practice of this invention a standard oil oxidation test is used. The equipment and test procedure described by Kroger et al., Erdol and Kohle, 2, page 398 (1949) served as a basis for the tests. The equipment and procedures are slightly modified in order to make the oxidizing conditions more strenuous. In this manner the test lubricants are subjected to severe oxidizing conditions in order to conclusively establish the effectiveness of additives under very adverse conditions. Furthermore, the modifications are found to provide results which correlated extremely well with test results of other standard procedures, including actual engine tests.

The equipment consists of a reaction cell connected with an open end manometer whereby the total uptake of oxygen by the oil is determined by noting the drop in height of the mercury in the manometer. The test oil sample is placed in the reaction cell which is then flushed with oxygen and the temperature is then raised and held at that selected for the test until the substrate oil undergoes catastrophic oxidation which is shown by a rapid oxygen uptake. In all cases the test oil is deliberately contaminated with iron hexoate as an oxidation promoter. In tests of this nature, the oxidation stability of a test lubricant is determined by measuring its induction period, that is, the time required for catastrophic deterioration under the above outlined conditions. The longer the induction period, the more stable the lubricant. In tests of this nature, at 150° C., a base oil containing no additive had an induction time of 3 minutes while the same oil containing $1.0 \times 10^{-2}$ moles per liter of $\alpha,\alpha'$-thiobis(2,6-di-tert-butyl-p-cresol) had an induction time of 129 minutes, thus increasing the induction time by a factor of 43.

To further show the useful properties of the novel compounds of this invention, recourse is had to the Polyveriform Oxidation Stability Test as described in the paper entitled "Factors Causing Lubricating Oil Deterioration in Engines" [Ind. and Eng. Chem., Anal. Ed., 17, 302 (1945)]. See also "A Bearing Corrosion Test for Lubricating Oils and Its Correlation With Engine Performance" [Al. Chem., 21, 737 (1949)]. This test effectively evaluates the performance of lubricating oil antioxidants. The test equipment procedure employed and correlations of the results with engine performance are discussed in the first paper cited above. By employing various compounds of this invention in oxygen-sensitive lubricating oil, effective inhibition of oxidative deterioration is achieved.

Comparative tests were conducted using the method and apparatus essentially as described in the publication described above entitled, "Factors Causing Lubricating Oil Deterioration in Engines." One minor modification was that the steel sleeve and copper test piece described in this publication were omitted from the apparatus. In these tests an initially additive-free 95 V.I. solvent refined SAE-10 crankcase oil was used. The principal test conditions consisted of passing 70 liters of air per hour through the test oil for a total period of 20 hours while maintaining the oil at a temperature of 300° F. Oxidative deterioration of the oil was further promoted by employing as oxidation catalysts 0.05 percent by weight of ferric oxide (as ferric 2-ethyl hexoate) and 0.10 percent by weight of lead bromide, both of these amounts being based upon the weight of oil employed.

Lubricating oils of this invention were prepared by blending one percent by weight of $\alpha,\alpha'$-thiobis(2,6-di-tert-butyl-p-cresol) with the oil described above. These compositions were compared in the Polyveriform test with a sample of the oil not containing the antioxidant. Whereas during the test the oil containing no antioxidant increases in acid number to a high acid number and shows a tremendous increase in viscosity, the samples containing the antioxidants of this invention show only a slight acid number and an unappreciable increase in viscosity, thus showing an unusual improvement over the base oil.

The following examples illustrate the preferred lubricating oil compositions of this invention.

*Example 5*

To 1,000 parts of a solvent refined neutral oil 95 V.I. and 200 SUS at 100° F. containing 6 percent of a commercial methacrylate Type VI approver which gives the finished formulation of a V.I. of 140 and a viscosity of 300 SUS at 100° F. is added 5 percent of $\alpha,\alpha'$-thiobis(2,6-di-tert-butyl-p-cresol).

*Example 6*

To an additive-free solvent refined crankcase lubricating oil having a viscosity index of 95 and an SAE viscosity of 10 is added 0.001 percent of $\alpha,\alpha'$-thiobis(2-6-diisopropyl-p-cresol).

*Example 7*

To 100,000 parts of a petroleum hydrocarbon oil having a gravity of 30.3° API at 60° F., a viscosity of 178.8 SUS at 100° F. a viscosity index of 154.2 and which contains 0.2 percent sulfur, is added 200 parts of $\alpha,\alpha'$-thiobis(2-methyl-6-tert-butyl-p-cresol). The resulting oil possesses greatly enhanced resistance to oxidative deterioration.

*Example 8*

To 100,000 parts of a commercially available pentaerythritol ester having a viscosity at 100° F. of 22.4 centistokes, and known in the trade as "Hercoflex 600" is added 400 parts (0.4 percent) of $\alpha^4,\alpha^{4'}$-thiobis(2-methyl-6-isopropyl-4-n-propyl phenol). The resulting finished oil possesses markedly improved resistance against oxidative deterioration.

*Example 9*

To 100,000 parts of dioctyl sebacate having a viscosity of 210° F. of 36.7 SUS, a viscosity index of 159 and a molecular weight of 426.7 is added 250 parts (0.25 percent) of (3-amyl-5-decyl-4-hydroxybenzyl)-[3-ethyl-5-(2'-dodecyl)-4-hydroxybenzyl]thioether.

The compounds of this invention are also useful as additives to functional fluids and automatic transmission fluids. The primary constituent of a functional fluid is a refined mineral lubricating oil having a carefully selected minimum viscosity of 49 Saybolt Universal seconds (SUS) at 210° F. and a maximum viscosity of 7,000 SUS at 0° F., generally a distillate oil, lighter than an SAE-10 motor oil. The oil usually amounts to between about 73.5 to about 97.5 percent by weight of the finished fluid. Preferably, the base oil is selected from a paraffin base distillate such as a Pennsylvania crude.

The fluids usually contain compounds which are characterized by containing one or more organic components which may be alkyl, aryl, alkaryl or aralkyl groups that are bonded to one or more metal atoms through coupling groups such as sulfonate, hydroxyl, carboxyl and mercaptan. The metal atoms may be aluminum, calcium, lithium, barium, strontium, and magnesium. The organic components contain oil solubilizing groups such as high molecular weight straight or branched chain paraffins, aromatic or naphthenic rings, or contain a halogen. These metal compounds are present in the compounded fluid in a concentration range of between about 0.1 to about 5 percent by weight. These compounds include alkaline-earth metal salts or phenyl-substituted long chain fatty acids, alkaline-earth metal salts of the capryl or octyl esters of salicylic acid, the alkaline-earth metal salts of petroleum sulfonic acids, the alkaline-earth metal salts of alkyl-substituted phenol sulfides, the salt of aluminum or the alkaline-earth metals with cetyl phenol, and the metal salts of wax-substituted phenol derivatives. Another class of additives are the so-called overbased phenates and sulfonates, which can be prepared by reaction between an alkyl phenol or alkyl phenol sulfide and an alkaline-earth metal oxide or hydroxide at an elevated temperature. The overbased phenate formed from the reaction contains up to two or three times as much metal as the normal phenate.

In addition, functional fluids may contain additional components which improve the properties of the fluid. Typical components include anti-squawk additives, pour point depressants, foam inhibitors, rust preventatives, extreme pressure agents, metal deactivators and viscosity index improvers.

The following examples show typical functional fluids of this invention. The fluids are formed by mixing the ingredients together, while heating the oil to a temperature up to 200° F.

*Example 10*

A fluid of this invention is prepared by blending 80 parts of a conventionally-refined Pennsylvania mineral oil (99 SUS at 100° F.), 2 parts of $\alpha,\alpha'$-thiobis(2,6-di-tert-butyl-p-cresol), 5 parts of barium petroleum sulfonate, 10 parts of a polyacrylate having a molecular weight of approximately 7,000 derived from a fatty alcohol such as cetyl or lauryl alcohol, 0.1 part of a dimethyl silicone polymer anti-foam agent, 2 parts of a dialkyl zinc dithiophosphate and 0.9 part of a dark, viscous liquid having a viscosity of 560 SUS at 210° F., a flash point of 420° F., a pour point of 30° F. and a specific gravity of 60/60° F. of 0.919.

*Example 11*

Another such fluid consists of 95 parts of a solvent refined, light acid-treated, clay-contacted, solvent dewaxed paraffin base distillate mineral oil (110 SUS at 100° F.); 0.1 part of $\alpha^4,\alpha^{4'}$-thiobis[2-n-butyl-6-(2'-nonyl)-p-n-dodecylphenol]; 0.1 part of calcium octylphenol sulfide; 2 parts of a sulfurized sperm oil having a sulfur content between 10–12 percent, a viscosity of 210° F. of 200 SUS and a pour point of 65° F.; 0.3 part of an ester of an aromatic acid and wax-alkylated phenol having a molecular weight of approximately 450; 2.5 parts of a linear pale color isobutylene polymer of a controlled molecular weight having a viscosity of 3,000 SUS at 210° F., a specific gravity of 60/60° F. of 0.875.

Liquid hydrocarbon fuels employed in the operation of spark ignition combustion engines are also vastly improved in their storage stability by the practice of this invention. Table I, below, gives the compositions of a number of typical commercial gasolines which may be stabilized against oxidative deterioration by the inclusion therein of a compound of this invention.

TABLE I.—GASOLINE COMPOSITIONS

| Gasoline | Percent Aromatics | Percent Olefins | Percent Saturates | Gravity, °API |
|---|---|---|---|---|
| A | 26.6 | 20.8 | 52.6 | 62.1 |
| B | 8.6 | 7.9 | 83.5 | 68.5 |
| C | 20.0 | 41.2 | 38.8 | 62.9 |
| D | 20.5 | 32.9 | 46.6 | 63.5 |
| E | 38.1 | 7.3 | 54.6 | 59.3 |

*Example 12*

To 1,000 parts of Gasoline A, as described in Table I, is added 10 parts of $\alpha^4,\alpha^{4'}$-thiobis[2-n-amyl-6-n-(4'-dodecyl)-p-n-butylphenol].

*Example 13*

To 10,000 parts of Gasoline B is added 50 parts of $\alpha,\alpha'$-thiobis(2-methyl-6-tert-butyl-p-cresol).

*Example 14*

To 500 parts of Gasoline C, as described in Table I, is added 10 parts of $\alpha^4,\alpha^{4'}$-thiobis(2-n-amyl-6-isopropyl-p-heptylphenol).

*Example 15*

To 2,000 parts of Gasoline D is added 15 parts of $\alpha,\alpha'$-thiobis(2,6-di-tert-butyl-p-cresol).

*Example 16*

To 10,000 parts of Gasoline E is added 500 parts of [3 - ethyl-5-(2'-decyl)-4-hydrxybenzyl] - [3-ethyl-5-(3'-dodecyl)-4-hydroxybenzyl] thioether.

Antiknock compositions and spark ignition internal combustion engine fuels containing mixtures of organolead antiknock agents and cyclopentadienyl manganese tricarbonyls are also vastly improved in their storage stability by the practice of this invention. Such compositions are described more fully in U.S. Patent No. 2,818,417.

Despite their great general stability cyclopentadienyl manganese tricarbonyls accelerate and in some cases cause deterioration of leaded gasolines containing them. Research has shown that cyclopentadienyl manganese tricarbonyls serve as deterioration catalysts but the manner by which they exert this adverse effect cannot presently be explained. All available evidence indicates that the manganese compounds catalyze the simultaneous deterioration of the organolead antiknock agent and the base fuel. This results in the premature formation of organolead decomposition products (both soluble and insoluble) and gum and other sludges resulting primarily from the fuel deterioration. In addition, the amounts of these decomposition products are ultimately increased. Hence, the problem is a combination of increased rate of deterioration and increased extent of deterioration.

The problem is not merely the conventional one of providing protection against the oxidative deterioration of clear gasolines or of leaded gasolines. For instance, a number of powerfully effective antioxidants of proven ability to stabilize clear and leaded gasolines have been found to fail completely when used in an attempt to overcome this problem. In fact, after much research it has been found that prior concepts of gasoline and gasoline additive stabilization are of no help whatsoever in seeking to find a solution to this complex problem.

As a further illustration of the unique character of this problem, it has been found that a widely used metal deactivator—N,N' - disalicylidene - 1,2 - diaminopropane—affords no relief whatsoever from the present problem. In fact, the metal deactivator actually further increases the amount of deterioration that occurs in manganese-containing leaded gasolines. Hence the present problem is not a simple type of metal catalyzed oxidative deterioration that can be remedied by conventional means, such as by complexing metallic fragments (produced by initial decomposition of the metallic additives) by means of a metal deactivator. It is seen that the present problem is the result of a highly complex interplay among the various ingredients (and perhaps their decomposition products) of these commercially important organolead manganese compositions.

Leaded gasolines containing a minor amount of a cyclopentadienyl manganese tricarbonyl or cyclopentadienyl nickel nitrosyl can be effectively stabilized by the presence therein of a small quantity of a compound of this invention, such as $\alpha,\alpha'$ - thiobis(2,6 - di - tert - butylp-cresol). These compounds have been found to completely eliminate the problem at hand. In fact, in many cases, the compositions of this invention have stabilities at least as great as those of the corresponding manganese and nickel-free leaded gasolines.

In the compositions of this invention the concentrations of the prime ingredients will vary. Thus the finished fuels of this invention can contain from about 0.2 to about 6.4 grams of lead per gallon as an organolead antiknock agent. The manganese or nickel concentrations therein can range from about 0.005 to about 6 grams per gallon as a cyclopentadienyl manganese tricarbonyl or cyclopentadienyl nickel nitrosyl respectively. On a cost effectiveness basis, finished motor fuels containing per gallon from about 1 to about 4 grams of lead and from 0.05 to about 2 grams of manganese or nickel are preferred. In all of these finished fuels the concentration of the above compounds of this invention can be from about 0.0002 to about 0.01 weight percent based on the fuel. Expressed in different units these concentrations correspond respectively to about 0.5 to about 25 pounds per thousand barrels of fuel. These concentrations are sufficient to inhibit the deterioration which would occur in the absence of the compounds of this invention.

In formulating finished fuels it is common practice to employ concentrated gasoline solutions of the additives. These stock solutions are then cut with or metered into the remainder of the gasoline to achieve the appropriate concentration in the finished fuel. A feature of this invention is that such concentrated stock solutions are likewise very effectively stabilized by the presence therein of the above compounds of this invention. Consequently, the concentrations of the above ingredients can be as much as 10 times as high as those set forth above. The choice of concentrations is within the discretion of the refiner and takes into consideration the quantities of gasoline being processed, the storage temperatures to be accounted, the length of storage involved, etc. The specific concentrations given above are for illustrative purposes only and are not to be considered as limitations upon this invention.

Another embodiment of this invention is an antiknock fluid composition adopted for use as an additive to gasoline, which composition consists essentially of an organolead antiknock agent, a cyclopentadienyl manganese tricarbonyl or cyclopentadienyl nickel nitrosyl and a compound of this invention as defined above, there being present in the composition from about 0.00078 to about 30 parts by weight of manganese or nickel per part of lead and from about 0.1 to about 5 weight percent of the compounds of this invention based on the weight of the organolead antiknock agent. These compositions possess greater stability by virtue of the presence therein of a compound of this invention. Furthermore, these compositions provide an excellent vehicle by which the finished fuels of this invention can be formulated.

The foregoing compositions of this invention can also contain other additives known in the art. Halogen scavengers for the organolead antiknock agents (ethylene dibromide and/or ethylene dichloride, etc.), corrective agents (phosphorous, arsenic and antimony compounds, etc.), dyes, solvents and/or diluents are illustrative of the types of additives which can be co-present.

To demonstrate the striking improvement resulting from this invention, storage tests were conducted, a number of fuel blends were made up using two commercially available gasolines of widely differing stabilities. Each of these base fuels was treated with tetraethyllead so that the concentration thereof was 3 ml. per gallon (3.18 grams of lead per gallon). The tetraethyllead was used in the form of commercial motor mix (tetraethyllead, 0.5 theory of ethylene dibromide and 1.0 theory of ethylene dichloride). To portions of each of these fuels was then added methylcyclopentadienyl manganese tricarbonyl to a concentration of 0.5 grams of manganese per gallon. Samples of these manganese-containing leaded fuels were then treated per this invention with $\alpha,\alpha'$-thiobis(2,6 - tert - butyl - p - cresol), a compound of this invention. Concentrations equivalent to six pounds per one thousand barrels were used. For comparative purposes, identical samples were made up containing six pounds per one thousand barrels of a commercial antioxidant of proven ability and widely used to stabilize gasolines both clear and leaded. This additive is referred to below as "commercial additive."

The various test fuels were stored at 110° F. and periodically analyzed to determine their content of gum and soluble alkyl lead salts. The gum content was determined by the standard ASTM tests procedure D–381. The soluble alkyl lead salts were determined by extracting samples of the stored fuels with an ammonia ammonium acetate solution and assaying the amount of lead so extracted. The formation of gum and soluble alkyl lead salts is, of course, proof that decomposition of the fuel has taken place. Therefore, the relative stabilities of the test fuels were directly measured by determining the length of time required to form 7 mg. of gum per 100 ml. of fuel and 3 mg. of lead as soluble alkyl lead salts per 100 ml. of fuel. The longer the time required to form these amounts of decomposition products the more stable was the fuel compositions. In this test, fuels of this invention were stable for 16 hours, while the fuels without compound of this invention were stable for only 9 hours. In contrast the commercial additive failed to raise the stability of the fuels.

The following examples illustrate the compositions of this invention and the methods by which they are prepared.

*Example 17*

To 1000 gallons of a commercial gasoline having a gravity of 59.0° API, an initial boiling point of 98° F. and a final boiling point of 390° F. are added 3.18 grams per gallon of lead as tetraethyllead, 0.6 theory (based on the lead) of bromine as ethylene dibromide, 1.0 theory (based on the lead) of chlorine as ethylene dichloride, 0.25 gram of manganese per gallon as methylcyclopentadienyl manganese tricarbonyl and 0.0002 weight percent (based on the gasoline) of $\alpha,\alpha'$-thiobis (2,6 - di - tert - butyl - p - cresol). The resultant fuel possesses enhanced stability characteristics.

*Example 18*

With a gasoline having an initial boiling point of 93° F., a final boiling point of 378° F., an API gravity of 56.2° and a tetraethyllead content equivalent to 0.2 gram of lead per gallon are blended cyclopentadienyl nickel nitrosyl to a concentration of 0.05 gram of nickel per gallon and $\alpha,\alpha'$-thiobis(2-methyl-6-tert-butyl-p-cresol) to a concentration of 0.005 weight percent (based on the gasoline). The finished fuel so formed possesses improved stability properties.

*Example 19*

To a gasoline having an API gravity of 51.5°, an initial boiling point of 91° F. and a final boiling point of 394° F. are blended 6.4 grams of lead per gallon as tetrabutyllead, 2 grams of manganese per gallon as octylcyclopentadienyl manganese tricarbonyl and 0.0008 weight percent (based on the gasoline) of $\alpha^4,\alpha^{4'}$-thiobis(2,6-diisopropyl-p-cresol). The resultant fuel possesses very good stability.

*Example 20*

With a gasoline having an initial boiling point of 92° F. and a final boiling point of 410° F. are blended 2 grams of lead per gallon as tetraphenyllead, 6 grams of nickel as diethylcyclopentadienyl nickel nitrosyl, 1 theory (based on the lead) of bromine as ethylene dibromide and 0.01 weight percent (base on the gasoline) of $\alpha,\alpha'$-thiobis (2-n-propyl-6-n-dodecyl-p-cresol). The finished fuel has very good storage stability.

This invention also extends to the use in the above compositions of manganese pentacarbonyl (i.e., dimanganese decacarbonyl).

The compounds of this invention are also very effective antioxidants for high molecular weight unsaturated hydrocarbon polymers, such as polybutadiene, methyl rubber, polybutene rubber, natural rubber, butyl rubber, GR–S rubber, GR–N rubber, piperylene rubber, dimethyl butadiene rubber and the like. Thus a preferred embodiment of the present invention is a rubber containing as an antioxidant therefor, a compound of this invention as defined above. Another part of this invention is the method of preserving rubber which comprises incorporating therein a compound of this invention as defined above. The stabilizer is incorporated into the rubber by milling, Banbury mixing, or similar process, or is emulsified and the emulsions added to the rubber latex before coagulation. In the various embodiments of this invention the stabilizer is used in small amounts, generally ranging from about 0.01 to about 5.0 percent, based on the rubber.

As used in the description and claims, the term "rubber" is employed in a generic sense to define a high molecular weight plastic material which possesses high extensibility under load coupled with the property of forcibly retracting to approximately its original size and shape after the load is removed. It is preferable that the rubber be a sulfur-vulcanizable rubber, such as India rubber, reclaimed rubber, balata,, gutta-percha, rubbery conjugated diene polymers and copolymers exemplified by the batadiene-styrene (GR–S) and butadiene-acrylonitrile (GR–N or Paracril) rubbers and the like, although the invention is applicable to the stabilization of any rubber, high molecular weight organic material which is normally susceptible to deterioration in the presence of oxygen, air, or ozone. The nature of these rubbers is well known to those skilled in the art.

Among the definite advantages provided by this invention is that the present rubber compositions possess unusually great resistance against oxidative deterioration. Moreover, these compositions exhibit excellent non-staining and non-discoloration characteristics. Furthermore, the novel stabilizer is relatively inexpensive and easily prepared, and possesses the highly beneficial property of low volatility. As is well known, a highly desirable feature of a rubber antioxidant is that it have a low volatility so that it remains admixed with the rubber during vulcanization and related process steps.

The rubber compositions of the present invention are illustrated by the following specific examples wherein all parts and percentages are by weight.

*Example 21*

To illustrate the enhanced oxygen resistance of the rubber compositions of this invention and their excellent non-staining and non-discoloration characteristics, a light-colored stock is selected for test. This stock had the following composition:

| | Parts by weight |
|---|---|
| Pale crepe rubber | 100.00 |
| Zinc oxide filler | 50.00 |
| Titanium dioxide | 25.00 |
| Stearic acid | 2.00 |
| Ultramarine blue | 0.12 |
| Sulfur | 3.00 |
| Mercaptobenzothiazole | 1.00 |
| | 181.12 |

To the above base formula is added one part by weight of $\alpha,\alpha'$-thiobis(2,6-di-tert-butyl-p-cresol) and individual samples are cured for 20, 30, 45 and 60 minutes at 274° C. using perfectly clean molds with no mold lubricant. Another set of samples of the same base formula which do not contain an antioxidant are cured under the same conditions.

*Example 22*

To a synthetic rubber master batch comprising 100 parts of GR–S rubber having an average molecular weight of 60,000, 50 parts of mixed zinc propionate-stearate, 50 parts of carbon black, 5 parts of road tar, 2 parts of sulfur and 1.5 parts of mercaptobenzothiazole is incorporated 1.5 parts of $\alpha,\alpha'$-thiobis(2-methyl-6-n-propyl-p-cresol). This batch is then cured for 60 minutes at 45 p.s.i. of stream pressure.

*Example 23*

Natural rubber stock is compounded according to the following formula:

| | Parts |
|---|---|
| Thick gristly crepe natural rubber | 100 |
| Wax | 2 |
| Ultramarine dye | 0.1 |
| Zinc oxide | 70 |
| Titanium dioxide | 20 |
| Sulfur | 3 |
| Stearic acid | 1.2 |
| $\alpha^4,\alpha^{4'}$-Thiobis(2-nonyl-6-isopropyl-p-ethylphenol) | 1 |
| Benzothiazyl disulfide | 0.4 |
| Amine activator | 0.5 |

This stock is then vulcanized for 60 minutes at 280° F.

*Example 24*

A butadiene-acrylonitrile copolymer is produced from butadiene-1,3 and 32 percent of acrylonitrile. Two percent (based on the dry weight of the copolymer) of $\alpha,\alpha'$-thiobis(2-n-amyl-6-n-propyl-p-cresol) is added as an emulsion in sodium oleate solution to the latex obtained from emulsion copolymerization of the monomers. The latex is coagulated with a pure grade of aluminum sulfate and the coagulum, after washing, is dried for 20 hours at 70° C.

Each of the above illustrated rubber compositions of this invention possesses greatly improved resistance against oxidative deterioration as compared with the corresponding rubber compositions which are devoid of an antioxidant. Moreover, the light-colored stocks of the above examples exhibit vitually no discoloration or staining characteristics even when subjected to severe weathering conditions and the like. The methods of formulating the improved rubber compositions of this invention will now be clearly apparent to those skilled in the art.

The amount of stabilizer employed in the rubber compositions of this invention varies from about 0.01 to about 5 percent by weight based on the weight of the rubber. The amount used depends somewhat upon the nature of the rubber being protected and the conditions of service to be encountered. Thus, in the stabilization of natural and synthetic rubber to be used in the manufacture of tires which are normally subjected to exposure to the elements, as well as to the action of sunlight, frictional heat, stress and the like, the use of relatively high concentrations of this inhibitor is advantageous. On the other hand, when the article of manufacture is not to be subjected to such severe conditions, relatively low concentrations can be successfully utilized. Generally speaking amounts ranging from about 0.1 to about 3 percent by weight give uniformly satisfactory results.

Other rubbers and elastomers which can be prepared according to this invention are the rubbery polymerizates of isoprene, butadiene-1,3 piperylene; also the rubbery copolymer of conjugated dienes with one or more polymerizable monoolefinic compounds which have the capability of forming rubbery copolymers with butadiene-1,3, outstanding examples of such monoolefinic compounds being those having the group $CH_2=C<$, exemplified by styrene. Examples of such monoolefins are styrene, vinyl naphthalene, alpha methyl styrene, p-chlorostyrene, dichlorostyrene, acrylic acid, methyl acrylate, methyl methacrylate, methacrylonitrile, methacrylamide, methyl vinyl ether, methyl vinyl ketone, vinylidine chloride, vinyl carbazole, vinyl pyridines, alkyl substituted vinyl pyridines, etc. In fact, excellent stabilization is achieved by incorporating a compound of this invention in any of the well known elastomers which are normally susceptible to deterioration in the presence of air, such as elastoprenes, elastolenes, elastothiomers, and elastoplastics.

As pointed out above, the compounds of this invention are effective antioxidants when added to other organic compositions normally tending to undergo deterioration in the presence of air, oxygen or ozone. The following examples illustrate various embodiments of this aspect of the invention.

*Example 25*

To a master batch of high molecular weight polyethylene having an average molecular weight of about 1,000,000, a tensile strength of 6,700 p.s.i., a Shore D hardness of 74 and a softening temperature under low load of 150° C. is added 5 percent of α,α′-thiobis(2,6-di-n-dodecyl-p-cresol) to prepare a composition of outstanding oxidative stability.

*Example 26*

A linear polyethylene having a high degree of crystallinity, up to 93 percent, and below 1 ethyl branched chain per 100 carbon atoms, a density of about 0.96 gram per milliliter and which has about 1.5 double bonds per 100 carbon atoms, is treated with $50 \times 10^{-6}$ roentgens of β-radiation. To the thus irradiated polymer is added 0.005 percent of α,α′-thiobis(2-isopropyl-6-tert-butyl-p-cresol) and the resulting product has better stability characteristics.

*Example 27*

Two parts of (3,5-di-tert-butyl hydroxybenzyl)-(3,5-di-isopropyl-4-hydroxybenzyl)thioether are added with milling to 100 parts of a low density polyethylene prepared by high pressure polymerization and which has an average molecular weight of 18,000 to 20,000. The resulting product is vastly improved in its oxidative stability.

*Example 28*

To 10,000 parts of a polyethylene having an average molecular weight of about 100,000 and which has a tensile strength of 5400 p.s.i., a Shore D hardness of 70 and a softening temperature of 130° C. under low load, is added 10 parts of α,α′-thiobis(2,6-di-tert-butyl-p-cresol) to prepare a composition of outstanding oxidative stability.

I claim:
1. A compound having the formula:

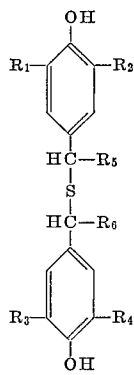

wherein $R_1$ and $R_3$ are independently selected alkyl radicals each having from one to 12 carbon atoms, $R_2$ and $R_4$ are independently selected alpha-branched alkyl radicals each having from 3 to 12 carbon atoms, and $R_5$ and $R_6$ are independently selected from the group consisting of hydrogen, alkyl radicals having from one to 12 carbon atoms and mononuclear aryl radicals having from 6 to 12 carbon atoms.

2. The compound of claim 1 wherein $R_5$ and $R_6$ are hydrogen.
3. The compound of claim 2 wherein $R_1$ equals $R_3$ and $R_2$ equals $R_4$.
4. α,α′-Thiobis(2,6-di-tert-butyl-p-cresol).
5. α,α′-Thiobis(2-methyl-6-tert-butyl-p-cresol).
6. A process for preparing benzyl thio ethers which comprises reacting a compound of the formula:

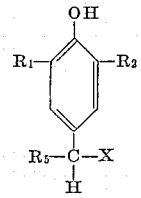

wherein $R_1$ is an alkyl radical having from 1–12 carbon atoms, $R_2$ is an alpha-branched alkyl radical having from 3–12 carbon atoms, $R_5$ is selected from the group consisting of hydrogen, alkyl radicals having from 1–12 carbon atoms and mono-nuclear aryl radicals having from 6–12 carbon atoms and X is halogen, first with thiourea and then chlorine to produce a benzyl sulfonyl chloride, reducing said benzyl sulfonyl chloride with sulfuric acid and metallic zinc to form a benzyl thiol, and reacting said benzyl thiol with a compound having the formula:

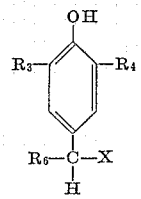

wherein $R_3$ is an alkyl radical having from 1–12 carbon atoms, $R_4$ is an alpha-branched alkyl radical having from 3–12 carbon atoms, $R_6$ is selected from the group consisting of hydrogen, alkyl radicals having from 1–12 carbon atoms and mono-nuclear aryl radicals having from 6–12 carbon atoms and X is halogen.

References Cited by the Examiner

UNITED STATES PATENTS

| | | | |
|---|---|---|---|
| 2,488,134 | 11/1949 | Mikeska et al. | 260—609 |
| 2,620,304 | 12/1952 | Stewart et al. | 252—48.2 |
| 2,623,855 | 12/1952 | Garner | 252—148.2 |
| 2,827,492 | 3/1958 | Fancher | 260—609 |
| 2,831,030 | 4/1958 | Chenicek | 260—609 |
| 2,976,324 | 3/1961 | Long et al. | 260—60 |

CHARLES B. PARKER, *Primary Examiner.*

JULIUS GREENWALD, ABRAHAM H. WINKELSTEIN, TOBIAS E. LEVOW, *Examiners.*

J. L. FOLTZ, D. D. HORWITZ, F. D. HIGEL,
*Assistant Examiners.*